Figure 1:
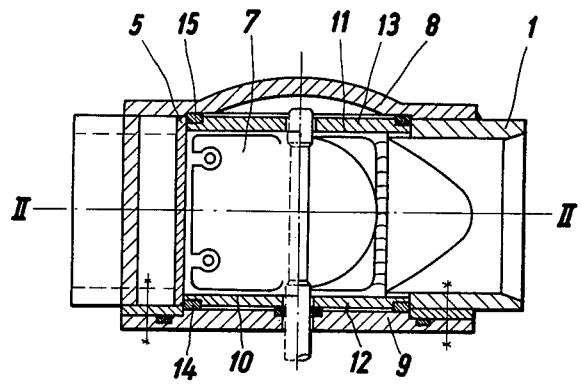

July 13, 1965  H. VIESSMANN  3,194,271
CHANGE-OVER AND MIXING DEVICE
Filed Sept. 18, 1962

United States Patent Office 3,194,271
Patented July 13, 1965

3,194,271
CHANGE-OVER AND MIXING DEVICE
Hans Viessmann, Im Hain, Battenberg (Eder), Germany
Filed Sept. 18, 1962, Ser. No. 224,352
Claims priority, application Germany, Sept. 19, 1961,
V 21,324; Nov. 18, 1961, V 21,619
3 Claims. (Cl. 137—625.43)

The present invention relates to a change-over and mixing device as used between the boiler flux and reflux and the heating system flux and reflux, and particularly to the configuration of the mixer housing and change-over valve.

Mixer devices of this kind are well known and are made either as castings or from welded parts. The welded mixer offers advantages in respect of production cost as compared with the cast type; however, both versions have disadvantages relating to corrosion, clearance loss, operating reliability consequently affected, and, in this connection, increments of the regulation range.

Known mixers comprise a cross of tubes in the centre of which a rotary slide valve is provided between a cover and a base plate so that fluxes and refluxes can be mixed to a varying degree in order to operate the overall heating system in a profitable way considering the temperatures desired. When the slide valve, the cover plate, and the base plate are made of cast iron as in conventional mixers, there is the danger that the slide valve may stall or be sized due to corrosion during a prolonged down time in which the heating system is inoperative. Manufacture of the complete mixer of red brass, which is in itself possible, is prohibited by the high cost involved. Considering the high pumping pressures now employed, it is moreover necessary to keep the clearance loss low; this calls for a high-accuracy fit of the interworking surfaces and edges formed by the edges of the rotary slide valve on the one hand and the cover-plate and base-plate flanges as well as the edges of the inter-penetrating tube sections on the other hand. If these parts are of iron, there exists the said danger of stalling; if made of anti-corrosive material, grooves and recesses may be formed by the scale, welding globules, sand, etc., often contained in the hot water of the system and tending to be trapped between closely fitting parts.

This danger of stalling is present not only for the base and cover plates of the mixer, but also for the butt edges of the tubes merging in the mixer space, especially because these inside edges are effected by the so-called deflectors provided on the cast rotary slide valves to control the mixing effect. These cast deflectors form prolonged areas of the outer edges of the slide valve, thus increasing the overall area of surfaces sliding upon each other. Apart from the impossibility to adapt these deflectors to a heating system in order to obtain a certain heating characteristic, their surfaces increase the susceptibility to trouble of a mixer in the sense above described.

It is therefore the object of the present invention to provide a mixer characterized by tight fitting of its parts to avoid clearance loss and thus offering the highest possible immunity against trouble, at the same time not only eliminating any negative effect upon the mixing process, but permitting positive controlling of the mixing effect.

This invention concerns a device comprising a tube cross housing having at least three connections defining seating means and interior top and bottom portions, said top and bottom portions being formed with annular flanges, a rotary slide valve centrally mounted within said housing interconnecting the tubes in defined increments, said rotary slide valve comprising a vane having top, bottom and side portions, said side portions coacting with said valve seating means, annular top and bottom covers mounted for relative movement on said top and bottom portions of said vane and O-ring resilient members interposed between said covers and the top and bottom annular flanges respectively urging said covers against said vane.

According to this invention, this object is achieved by a mixer essentially characterized by the cover and base faces of the mixer being lined with additional, flat covers of non-corroding metal or materials as brass, red brass, high-grade steel, plastics, etc., springy and sealing components being provided between such covers and the said cover faces and base faces, these sealing components being preferably the well known O-ring seals. Moreover, the deflectors that might be provided on the slide valve are recessed from the actual valve edges so that they do not come into contact with the inner edges of the mixer housing.

This configuration helps to achieve the object inasmuch as the areas of the slide-valve edges which are parallel to the vertical axis of the mixer housing, are reduced to a minimum; at the same time, the said intermediate covers are spring-loaded ensuring close fit while they will yield as soon as sand grains, welding globules or other impurities are trapped between these surfaces and the radial edges of the slide valve, thus preventing the cutting of grooves.

It is also possible to mount the said spring-loaded covers directly on the rotary slide valve as described in more detail below in connection with an embodiment.

This embodiment is illustrated by the drawings attached in which

Figure 2:
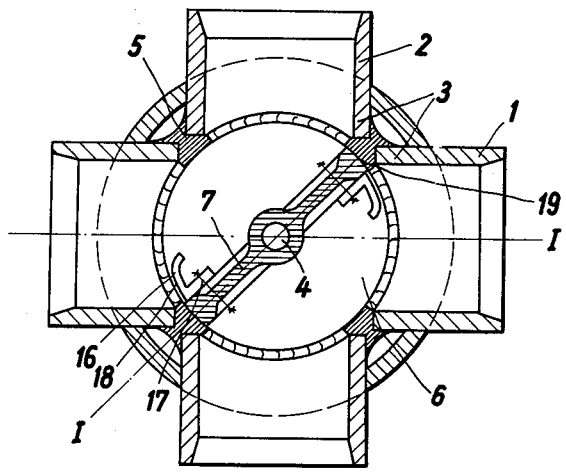
Figure 3:
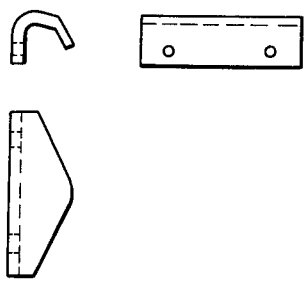
Figure 4:
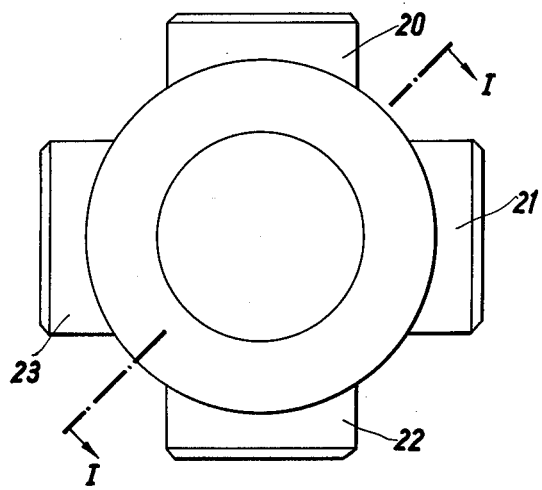
Figure 5:
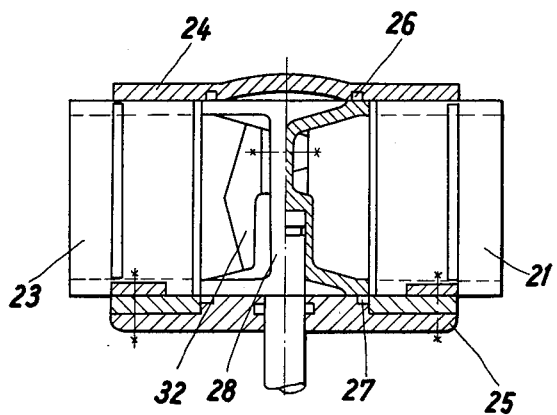
Figure 6:
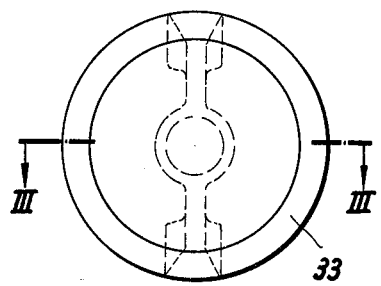
Figure 7:
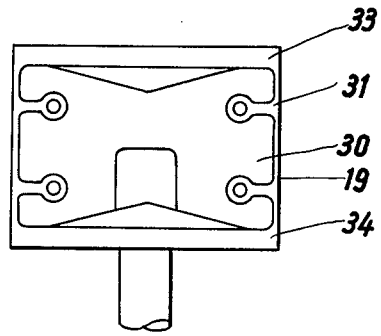
Figure 8:
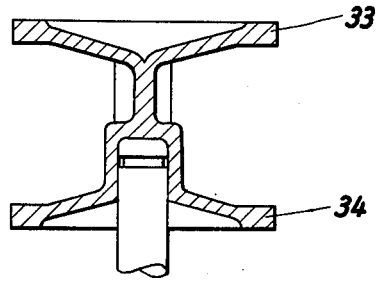

FIG. 1 is a section through the mixer according to the invention along the line I—I of FIG. 2, FIG. 2 is a section through the mixer along the line II—II of FIG. 1, FIG. 3 is the top view, horizontal projection and side elevation of one embodiment of a deflector, FIG. 4 is the mixer viewed from above, FIG. 5 is a section through the mixer along the line I—I of FIG. 4, FIG. 6 is the top view of the rotary slide valve, FIG. 7 is the side elevation of the slide valve, and FIG. 8 is the section through the slide valve along line III—III of FIG. 6.

Although the embodiment shown in FIGS. 1 and 2 provides a welded mixer, the characteristics of the present invention are likewise applicable to cast mixer housings.

Referring to the illustration, the mixer comprises the conventional cross of tube sections 1 and 2 having been shaped into a rectangular cross-section in the region of their inter-penetration 3 so that edges 5 are obtained which are parallel to the axis 4 of the rotary slide valve. The arrangement in accordance with this invention may also be employed for three-channel mixers. The cylindrical mixer space 6 is obtained by the top and base flanges 8 and 9, and the rotary slide valve 7 may be adjusted in this mixer space. The base flange may be permanently welded to the tube cross or flanged thereto as the top flange. As may be seen from FIG. 1, intermediate covers are mounted between the top and base flanges 8, 9 and the top and bottom edges 10, 11 of the slide valve; these covers 12, 13 are made of non-corrosive material as bronze, high grade steel, plastics, or the like.

A circular recess surrounds the edges of each the top and bottom covers 12, 13, and O-seals 14, 15 are placed in these recesses so that the said covers are spring-loaded by the elastic material of the O-rings and pressed to the valve flanks.

FIG. 2 shows the arrangement of the deflectors 16 on the slide valve 7 and an embodiment of a deflector is indicated in FIG. 3. The deflectors 17 may be fixed in place by the screws 17 and are so adjusted that their surfaces 18 are slightly recessed relative in the edge surfaces 19 of the valve 7 so that they do not slide on the edges 5 of the mixer housing. Owing to the arrangement, the sliding overall surface area is reduced in accordance with the invention; moreover, the deflectors can be conveniently exchanged so that by an exchange of deflectors, finer regulation and the desired heating characteristic can be obtained in a mixer without exchanging the complete valve 7. Thus, for instance, the deflector shown in FIG. 3 has a triangular shape permitting fine regulation, particularly when the valve 7 is positioned in the region of the edges 5. For a radial adjustment of the deflection, these or the valve 7 are produced with oblong holes or the like.

In another embodiment of the mixer, the covers 12, 13 may be assembled into one unit with the valve 7 as shown in FIGS. 4 through 8. Apart from the facilitation of manufacture and assembly, this embodiment provides elimination of the causes for trouble and clearance loss as stated above.

The illustration of FIG. 4 will be helpful in understanding the sectional view of FIG. 2. In accordance with FIGS. 4 and 5, the mixer housing is mainly made up of the four tube sections 20–23 and the flanges 24, 25. These flanges have annular grooves 26, 27 accommodating ring-shaped sealing components as O-rings. In this housing, the slide valve 28 illustrated in FIGS. 6–8 is rotatably mounted. The actual valve surface 30 has bearing areas 31 for the deflectors 32; the covers 33, 34 are directly joined to the valve by casting so that the valve 30 and the covers 33, 34 form a single part sealing against the housing by the ring grooves 26, 27 and the O-rings inserted in these grooves.

What is claimed as new and desired to be secured by Letters Patent is:

1. A change-over and mixer device comprising a tube cross housing having at least three connections defining valve seating means and interior top and bottom portions, said top and bottom portions being formed with annular flanges; a rotary slide valve centrally mounted within said housing interconnecting the tubes in defined increments, said rotary slide valve comprising a vane having top, bottom and side portions, said side portions coacting with said valve seating means, annular top and bottom covers mounted for relative movement on said top and bottom portions of said vane, and O-ring resilient members interposed between said covers and the top and bottom annular flanges respectively urging said covers against said vane.

2. The mixer as claimed in claim 1 including exchangeable deflector elements provided on the rotary slide valve, said deflector elements being radially recessed adjacent the side portions of the vane of said valve so as to prevent their contact with the inner edges of the housing.

3. The mixer as claimed in claim 2 wherein the deflector elements are adjustably mounted on the rotary slide valve.

References Cited by the Examiner
UNITED STATES PATENTS

| | | | |
|---|---|---|---|
| 1,092,441 | 4/14 | Heggem | 137—625.47 |
| 2,484,723 | 10/49 | Pain | 251—310 |
| 2,703,586 | 3/55 | Asker | 137—625.43 |

M. CARY NELSON, *Primary Examiner.*

ISADOR WEIL, MARTIN P. SCHWADRON,
*Examiners.*